(12) United States Patent
Hutson

(10) Patent No.: US 11,401,962 B2
(45) Date of Patent: Aug. 2, 2022

(54) FURNITURE BRACKET ASSEMBLY

(71) Applicant: DEL HUTSON DESIGNS, LLC, Forney, TX (US)

(72) Inventor: Edward Roland Hutson, Sunnyvale, TX (US)

(73) Assignee: DEL HUTSON DESIGNS, LLC, Forney, TX (US)

( * ) Notice: Subject to any disclaimer, the term of this patent is extended or adjusted under 35 U.S.C. 154(b) by 0 days.

(21) Appl. No.: 16/514,691

(22) Filed: Jul. 17, 2019

(65) Prior Publication Data
US 2021/0018028 A1 Jan. 21, 2021

(51) Int. Cl.
| *F16B 12/48* | (2006.01) |
| *A47B 13/00* | (2006.01) |
| *F16B 12/04* | (2006.01) |
| *F16B 12/10* | (2006.01) |

(52) U.S. Cl.
CPC ............ *F16B 12/48* (2013.01); *A47B 13/003* (2013.01); *F16B 12/04* (2013.01); *F16B 12/10* (2013.01); *F16B 2012/103* (2013.01); *F16B 2012/106* (2013.01)

(58) Field of Classification Search
CPC .......... F16B 12/48; F16B 12/04; F16B 12/10; F16B 2012/103; F16B 2012/106; A47B 13/003
USPC ....... 248/223.31, 544, 163.1, 165, 440, 188, 248/159, 218.4, 219.1, 219.2, 219.3, 248/220.21, 235, 239, 250; 108/153.1, 108/154, 155, 156, 157.16, 158, 158.12, 108/67, 108, 180, 187
See application file for complete search history.

(56) References Cited

U.S. PATENT DOCUMENTS

| 1,784,726 | A | | 12/1930 | Hallowell | |
| 1,915,180 | A | | 6/1933 | Bott | |
| 2,462,677 | A | | 2/1949 | Roberts | |
| 2,544,504 | A | | 3/1951 | Keys | |
| 2,783,112 | A | | 2/1957 | Slater | |
| 3,064,756 | A | | 11/1962 | Finizza | |
| 3,625,163 | A | * | 12/1971 | Grossman | A47B 47/05 108/59 |
| 3,779,622 | A | * | 12/1973 | Beaver | A47B 17/003 312/194 |
| 3,880,095 | A | * | 4/1975 | Clark | A47B 47/021 108/187 |
| 4,287,837 | A | * | 9/1981 | Bayles | A47B 13/003 108/154 |
| 4,317,416 | A | * | 3/1982 | Baum | A47B 17/006 108/157.1 |

(Continued)

*Primary Examiner* — Eret C McNichols
*Assistant Examiner* — Michael McDuffie
(74) *Attorney, Agent, or Firm* — Fish & Richardson P.C.

(57) ABSTRACT

A bracket assembly includes a bracket, such as a flat plate bracket, including a first surface, a second surface opposite the first surface, and a number of apertures through the bracket extending from the first surface to the second surface. The first surface engages at least one table top board. The bracket assembly also includes a number of studs protruding from the second surface of the bracket, the studs to selectively attach the bracket to a second bracket structure, such as a leg support system. The bracket assembly can be used in furniture assemblies to secure table tops, shelves, or other structures to a support structure.

25 Claims, 6 Drawing Sheets

(56) References Cited

U.S. PATENT DOCUMENTS

| | | | | |
|---|---|---|---|---|
| 4,424,604 A * | 1/1984 | Dupuis | B60B 33/0089 | |
| | | | 16/18 R | |
| 4,444,125 A * | 4/1984 | Welsch | A47B 13/021 | |
| | | | 108/155 | |
| 4,765,253 A * | 8/1988 | Schappach | A47B 3/06 | |
| | | | 108/158.12 | |
| 4,846,079 A * | 7/1989 | Ajax | A47B 13/021 | |
| | | | 108/156 | |
| 4,875,418 A * | 10/1989 | Moeckl | A47B 3/06 | |
| | | | 108/50.02 | |
| 4,883,331 A * | 11/1989 | Mengel | A47B 13/003 | |
| | | | 312/195 | |
| 4,986,194 A * | 1/1991 | Bollman | A47B 17/02 | |
| | | | 108/60 | |
| 5,142,996 A * | 9/1992 | Thorn | A47B 17/00 | |
| | | | 108/158 | |
| 5,537,793 A * | 7/1996 | Murasaki | A44B 18/00 | |
| | | | 52/585.1 | |
| 5,575,223 A * | 11/1996 | Hendel | F16B 12/46 | |
| | | | 108/193 | |
| 5,794,545 A * | 8/1998 | McDaniel | A47B 87/002 | |
| | | | 108/64 | |
| 6,082,838 A * | 7/2000 | Bissu-Palombo | A47B 3/12 | |
| | | | 108/115 | |
| 6,220,187 B1 * | 4/2001 | Grosser | A47B 13/003 | |
| | | | 108/155 | |
| 6,327,830 B1 | 12/2001 | Hecht | | |
| 6,367,393 B1 * | 4/2002 | Kasten | A47B 3/12 | |
| | | | 108/153.1 | |
| 6,899,040 B2 * | 5/2005 | Johnson | A47B 1/08 | |
| | | | 108/153.1 | |
| 7,028,620 B1 * | 4/2006 | Lyndon | A47B 87/0207 | |
| | | | 108/153.1 | |
| 7,661,374 B2 * | 2/2010 | Mullen, III | A47B 1/02 | |
| | | | 108/90 | |
| 8,079,315 B2 * | 12/2011 | Berent | A47C 4/03 | |
| | | | 108/158.12 | |
| 8,383,224 B2 * | 2/2013 | Heal | A47B 1/00 | |
| | | | 108/155 | |
| 8,671,644 B2 * | 3/2014 | Huang | A47B 13/06 | |
| | | | 108/155 | |
| 8,950,055 B2 | 2/2015 | Partridge | | |
| 9,215,923 B1 * | 12/2015 | Boone | A47B 3/06 | |
| 2004/0083934 A1 * | 5/2004 | Lin | A47B 13/021 | |
| | | | 108/155 | |
| 2008/0184917 A1 * | 8/2008 | Liu | A47B 13/003 | |
| | | | 108/157.16 | |
| 2009/0013908 A1 * | 1/2009 | Grove | A47B 21/06 | |
| | | | 108/159.11 | |
| 2018/0184802 A1 * | 7/2018 | Lin | A47B 47/0075 | |
| 2020/0093256 A1 * | 3/2020 | Mansson | A47B 41/02 | |

* cited by examiner

FURNITURE BRACKET ASSEMBLY

TECHNICAL FIELD

This disclosure relates to bracket assemblies, for example, furniture bracket assemblies.

BACKGROUND

Table tops, shelves, and other furniture items often use brackets to connect components together to form a sturdy structure. For example, table legs can be fixed to a table top with fasteners with or without the use of brackets.

SUMMARY

This disclosure describes bracket assemblies for attaching table tops to support systems.

In some aspects of the disclosure, a bracket assembly includes a bracket including a first surface, a second surface opposite the first surface, and multiple apertures through the bracket extending from the first surface to the second surface, the first surface to engage at least one table top board. The bracket assembly also includes multiple studs protruding from the second surface of the bracket, the multiple studs to selectively attach the bracket to a second bracket structure.

This, and other aspects, can include one or more of the following features. The second bracket structure can include a furniture leg support system. The multiple studs can include at least one of threaded studs, pins with key channels, or twist-lock fasteners. The multiple studs can be integral with the bracket. The multiple apertures can receive a fastener to couple the bracket to multiple table top boards. The bracket can be a flat plate bracket.

In certain aspects of the disclosure, a bracket assembly includes a bracket including a first surface and a second surface opposite the first surface, a first set of fastening elements on the first surface of the bracket to engage a plurality of table top boards and couple the bracket to the plurality of table top boards, and a second set of fastening elements on the second surface of the bracket, the second set of fastening elements to selectively couple the bracket to a second bracket structure.

This, and other aspects, can include one or more of the following features. The first set of fastening elements can include at least one of apertures, threaded studs, screws, nails, pins with key channels, twist-lock fasteners, adhesive, or adhesive channels. The first set of fastening elements can include multiple apertures through the bracket extending from the first surface to the second surface, and multiple securement fasteners to be disposed through the multiple apertures and engage the multiple table top boards. The first set of fastening elements can include at least one layer of adhesive on the first surface, the layer of adhesive to couple the bracket to the multiple table top boards. The first set of fastening elements can be integral with the first surface of the bracket. The first set of fastening elements can include nails or studs extending from the first surface and to engage the plurality of table top boards. The second set of fastening elements can include selectively releasable fasteners to selectively engage the second bracket structure. The selectively releasable fasteners can include at least one of threaded bolts, threaded studs, pins with key channels, or twist-lock fasteners. The second bracket structure can include a leg support system. The leg support system can include a furniture leg support. The bracket can be a flat plate bracket.

Certain aspects of the disclosure encompass a method for attaching a table top to a leg support system. The method includes attaching, with a first set of fastening elements of a bracket, a set of table top boards to the bracket on a first surface of the bracket, and selectively attaching, with a second set of fastening elements of the bracket, a leg support system to the bracket on a second surface of the bracket opposite the first surface.

This, and other aspects, can include one or more of the following features. The method can further include releasing the leg support system from the flat plate bracket. The method can further include attaching, with the second set of fastening elements, a second leg support system to the bracket on the second surface of the bracket. Attaching the set of table top boards to the bracket with the first set of fastening elements can include permanently fastening the bracket to the set of table top boards with at least one of nails, screws, or adhesive. Selectively attaching the leg support system to the bracket with the second set of fastening elements can include fastening the bracket to the leg support system with at least one of threaded bolts, threaded studs, pins with key channels, or twist-lock fasteners. The bracket can be a flat plate bracket.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
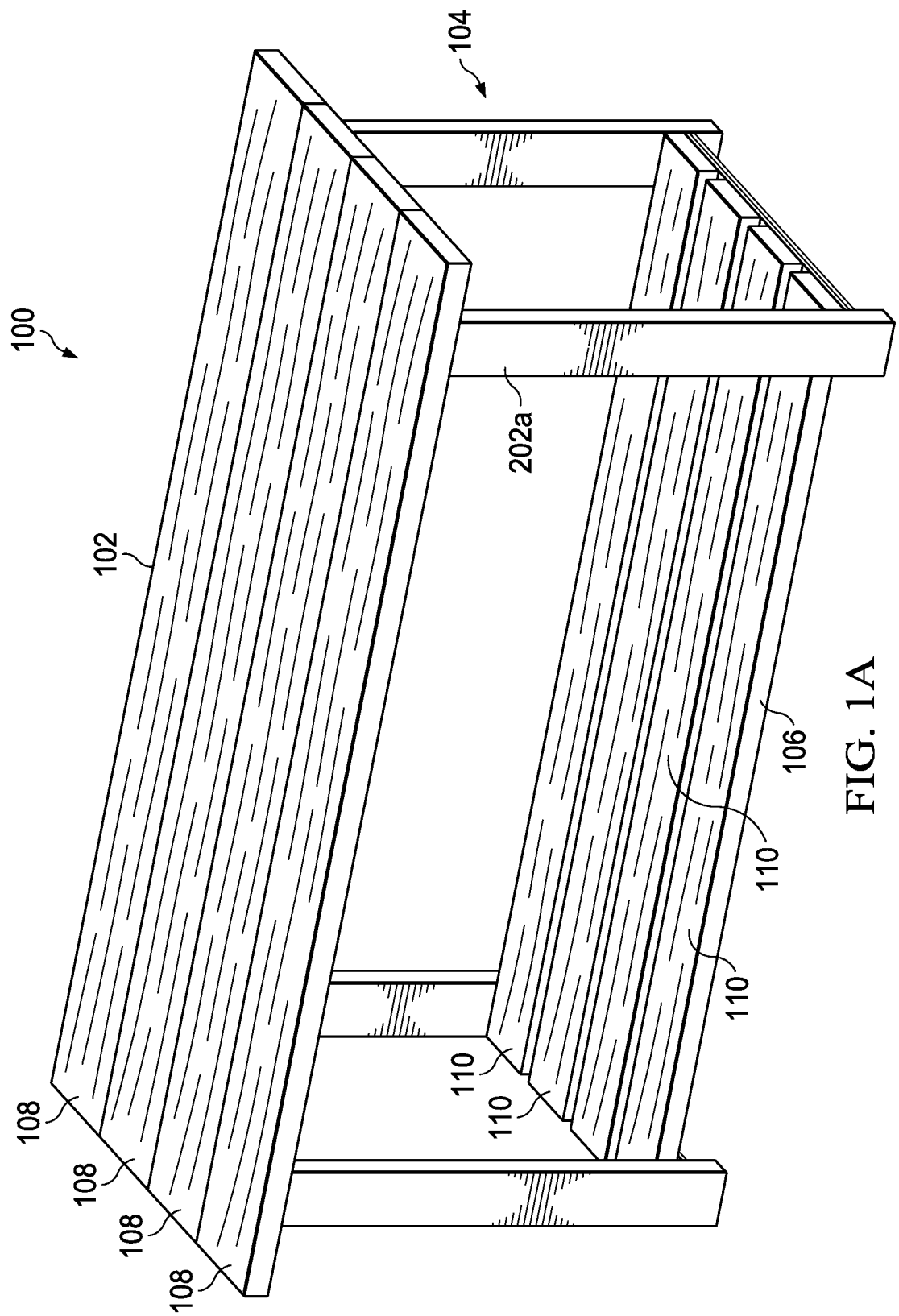
FIG. 1A is a perspective view of an example table that includes a table top, a support structure having table legs, and a bottom shelf.

This disclosure describes a bracket assembly that selectively (or releasably) connects two structural members. For example, the bracket assembly disclosed here can be used to attach a furniture table top to a furniture leg support. The bracket assembly includes a flat plate bracket that couples to a table top (e.g., a set of one or more table top boards forming a table top) with a first set of fastening elements, and selectively couples to a support assembly (e.g., a leg support structure) with a second set of fastening elements. The first set of fastening elements provides either a permanent or selectively releasable attachment of the flat plate bracket to the table top, and the second set of fastening elements provides a selective attachment to the support assembly that allows for a releasable connection of the flat plate bracket to the support assembly. This selectively releasable attachment provides for a modular style connection capability to several different support assemblies. In the present disclosure, a "permanent" attachment between two elements can mean an attachment that would cause some degree of damage to the attached elements if unattached. For example, attachment with nails or screws, if unfastened, would leave damage to a component. A "selective" (or "releasable") attachment between two elements means an attachment that does not damage the elements if unfastened. For example, an attachment with a threaded bolt and nut that engages a corresponding receiving aperture would not (considerably) damage a component, at least not to the degree of a nail, screw, or other damaging-type fastener.

In conventional furniture bracket assemblies, a table top and corresponding leg support systems often directly couple to each other with screws, nails, or other fasteners for permanent attachment, where uncoupling the table top and the leg support system causes damage to the table top, leg support system, or both. An embodiment of the bracket assembly of the present disclosure includes a flat plate bracket with two sets of fastening elements that connect a table top to a support structure with selective attachments, in that the support structure can easily connect and disconnect from the table top assembly without damage to the table top or the support structure. The bracket assembly provides a secure, but releasable, connection between a table top and a support structure, allowing for a modular style connection to a variety of different support structures. This bracket assembly allows for modular connection between a table top and a variety of different support structures via the bracket assembly, in that the selective (or releasable) connection between the bracket assembly and a support structure allows for interchangeable support structures to be attached to the bracket assembly and that are quick and easy to attach and/or release. This bracket assembly further allows for connection of boards, or other materials, to form a table top, bench top, or shelf.

Figure 1B:
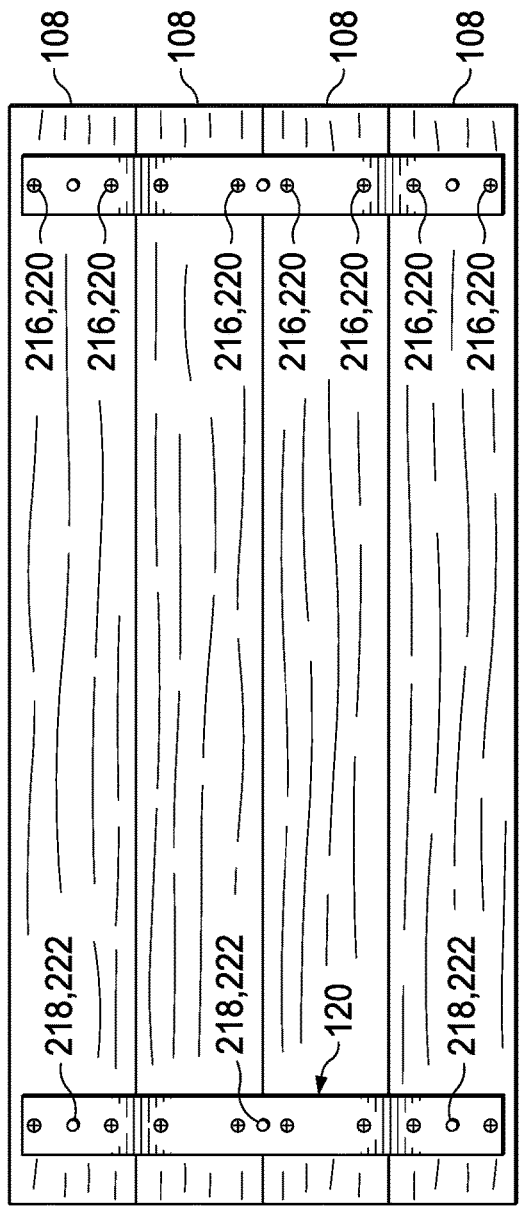
FIG. 1B is a bottom view of the table top of FIG. 1A.
Figure 1C:
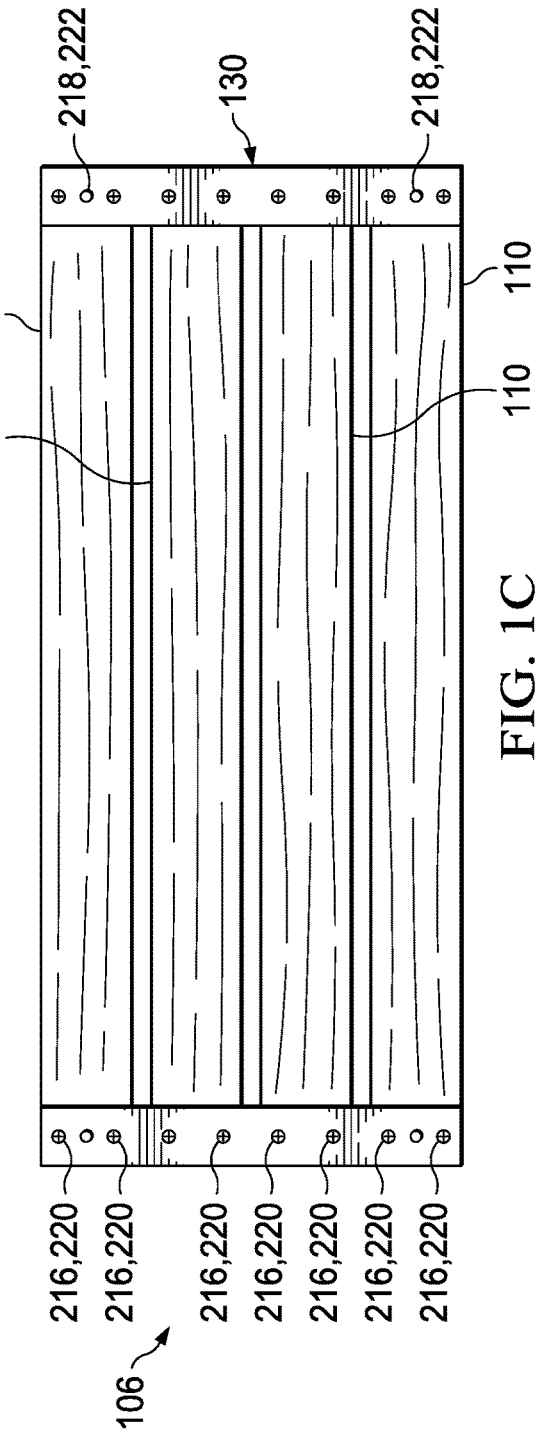
FIG. 1C is a bottom view of the bottom shelf of FIG. 1A.

FIG. 1A is a perspective view of an example table 100 that includes a table top 102, a support structure 104 (two shown proximate longitudinal ends of the table top 102) having table legs, and a bottom shelf 106. Each of the table top 102 and bottom shelf 106 can include a number of boards spanning a length (or partial length) of the table. For example, as shown in the example table 100 of FIG. 1, the table top 102 includes a set of table top boards 108 (four shown) oriented adjacent to and parallel to each other to form the rectangular table top 102, and the bottom shelf 106 includes a set of shelf boards 110 (four shown) oriented adjacent to and parallel to each other to form the rectangular bottom shelf 106. FIGS. 1B and 1C are bottom views of the table top 102 and of the bottom shelf 106, respectively.

Referring to FIGS. 1A-1C, the example table 100 includes a first bracket assembly 120 and a second bracket assembly 130. The first bracket assembly 120 selectively connects the table top 102 to the support structure(s) 104, and the second bracket assembly 130 selectively connects the bottom shelf 106 to the support structure(s) 104. The first bracket assembly 120 and the second bracket assembly 130 attach to the table top 102 and the bottom shelf 106, respectively, and allow for releasable attachment to respective portions of the support structure(s) 104, as described in more detail later. The first bracket assembly 120 and second bracket assembly 130 allow the table top 102, bottom shelf 106, or both, to interchangeably connect to and disconnect from a variety of different support structures to form a variety of different styles of tables. FIG. 1A shows an example table 100, though the first bracket assembly 120 and second bracket assembly 130 allows for the table top 102, bottom shelf 106, or both, to attach to one or more different support structures than the support structure(s) 104 shown in FIG. 1A.

Figure 2A:
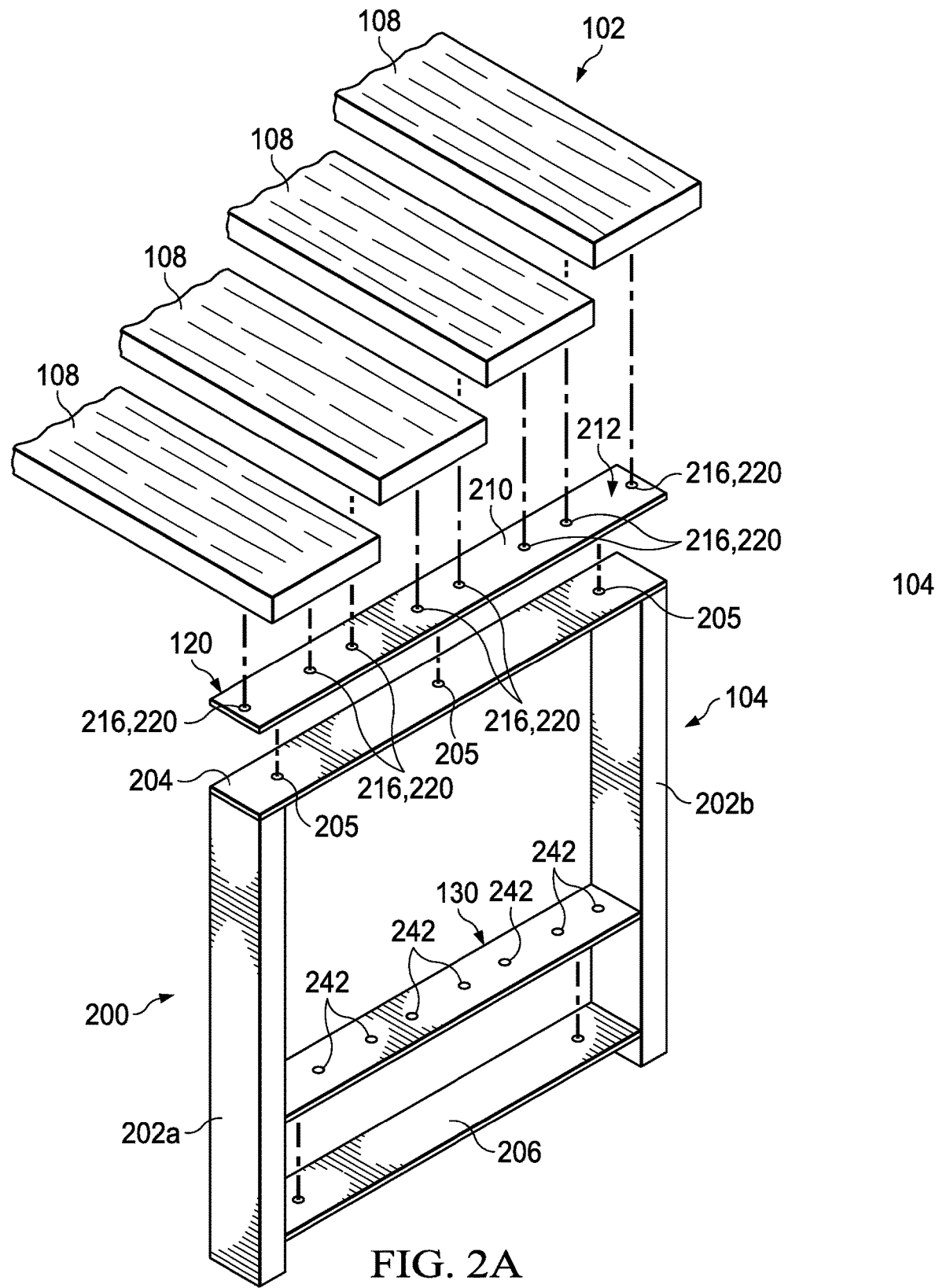
FIG. 2A is a schematic perspective and partially exploded view of the example support structure, the example first bracket assembly, and the example second bracket assembly of FIGS. 1A-1C.

FIG. 2A is a schematic perspective and partially exploded view of the example support structure 104, the example first bracket assembly 120, and the example second bracket assembly 130 of FIG. 1A. FIG. 2A does not show the example table top 102 or the example bottom shelf 106 for ease of viewing the first bracket assembly 120 and second bracket assembly 130. The example support structure 104 is shown as a rectangular frame (e.g., square frame) 200 with two vertical support members 202a and 202b attached by a first, upper bar 204 at top vertical ends of the support members 202a and 202b and by a second, lower bar 206 proximate bottom vertical ends of the support members 202a and 202b. The vertical support members 202a and 202b, upper bar 204, and lower bar 206 are connected to each other (e.g., coupled to, integral with, or otherwise connected to each other) to form the frame 200. However, the frame 200 of the example support structure 104 can take a variety of different forms. For example, the example support structure 104 can include additional or different frame members, such as X-shaped cross pieces extending from corner to corner of the frame instead of or in addition to the vertical support members 202a and 202b of frame 200. Further, the upper bar 204, lower bar 206, or both, can take a variety of different forms and shapes. For example, the upper bar 204 and lower bar 206 are both shown in FIG. 2A as flat, rectangular bars extending straight between side ends of the example frame 200; however, the upper bar 204 and lower bar 206 can include a curved, angled, zig-zagged, or otherwise differing pattern between the side ends of the frame.

The example support structure 104 forms a leg support system of, for example, table 100 of FIG. 1A. As such, the leg support system can form a furniture leg support. However, the details described herein regarding the first bracket assembly 120, second bracket assembly 130, or both, can be applied to other structural components other than tables or furniture.

Figures 2B, 4:
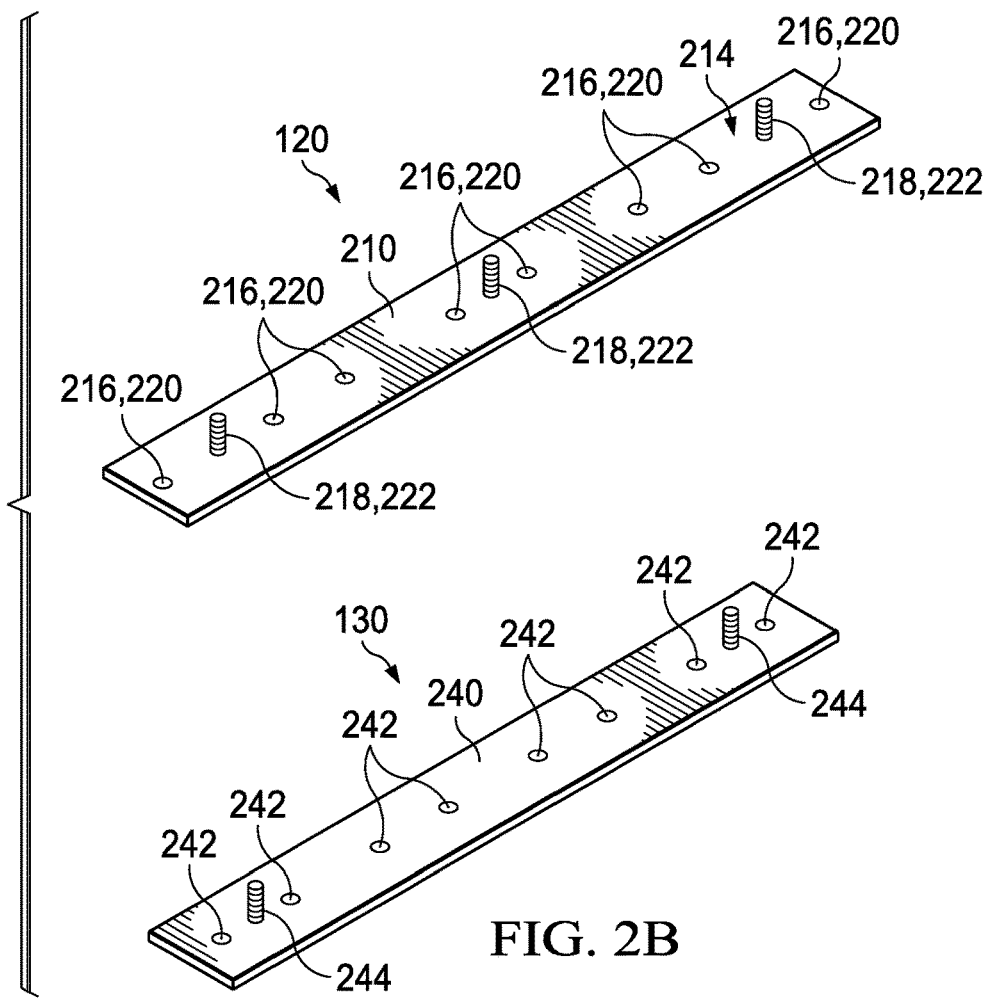
FIG. 2B is a schematic perspective view of the first bracket assembly and the second bracket assembly of FIG. 2A, showing an opposite surface than the respective surfaces shown in FIG. 2A.
FIG. 4 is a flowchart describing an example method for attaching a table top to a leg support system.

FIG. 2B is a schematic perspective view of the first bracket assembly 120 and the second bracket assembly 130, showing an opposite surface than the respective surfaces shown in FIG. 2A, as described in more detail later. The first bracket assembly 120 includes a flat plate bracket 210 having a first surface 212 and a second surface 214 opposite the first surface. For example, FIG. 2A shows the first surface 212 of the flat plate bracket 210, whereas FIG. 2B shows the second surface 214 of the flat plate bracket 210. The flat plate bracket 210 is substantially rectangular in shape, for example, to match (substantially or exactly) the size and shape of the upper bar 204. However, the flat plate bracket 210 can take on a different shape or size than that of the upper bar 204. The flat plate bracket 210 includes a first set of fastening elements 216 on the first surface 212 of the flat plate bracket 210. The first set of fastening elements 216 engage one or more table top boards, such as the table top boards 108 of table top 102 of FIGS. 1A and 1B. The first set of fastening elements 216 couples the table top boards 108 to the flat plate bracket 210, for example, such that a flat side of the table top boards 108 contact the first surface 212 of the flat plate bracket 210. The first set of fastening elements 216 are generally arranged and distributed along the dominant length of the first surface 212 of the flat plate bracket 210 proximate a lateral center of the first surface 212 of the flat plate bracket 210. However, this arrangement and distribution of the first set of fastening elements 216 can vary. The fastening elements can take the form of apertures or mounts for traditional fastening systems such as nails, screws, glue, or other fasteners.

The first bracket assembly 120 also includes a second set of fastening elements 218 on the second surface 214 of the flat plate bracket 210, where the second set of fastening elements 218 selectively couple the flat plate bracket 210 to the upper bar 204 of the support structure 104 (or to a different bracket or support structure). The second set of fastening elements 218 couples the flat plate bracket 210 to the support structure 104 such that the flat upper surface of the upper bar 204 contacts the second surface 214 of the flat plate bracket 210. The second set of fastening elements 218 are generally arranged and distributed along the dominant length of the second surface 214 of the flat plate bracket 210 proximate a lateral center of the second surface 214 of the flat plate bracket 210. However, this arrangement and distribution of the second set of fastening elements 218 can vary.

It is further understood that the flat plate bracket 210 can take the form of a flat plate, an L-angle, a C-channel, or other forms as may be desirable for manufacturing, strength, or aesthetics.

In the example first bracket assembly 120 of FIGS. 1A, 1B, 2A, and 2B, the first set of fastening elements 216 on the first surface 212 includes multiple apertures 220 through the flat plate bracket 210 from the first surface 212 to the second surface 214. The apertures 220 can receive a fastener (e.g., nail, screw, or other fastener type) to engage with the table top boards 108 and couple the flat plate bracket 210 to the multiple table top boards 108. The apertures 220 provide for a secure coupling of the flat plate bracket 210 to the table top boards 108. The flat plate bracket 210 is used to not only couple to the table top boards 108, but to also arrange the table top boards 108 in a desired orientation and position, for example, to form the table top 102 of FIGS. 1A and 1B. The first set of fastening elements 216 can provide either a permanent attachment or a selective attachment between the flat plate bracket 210 and the table top boards 108.

Though the first set of fastening elements 218 are shown in FIGS. 1A, 1B, 2A, and 2B as including the apertures 220, the first set of fastening elements 216 can take other forms. For example, the first set of fastening elements 216 can include apertures, threaded studs, screws, nails, pins with key channels, twist-lock fasteners, adhesive, adhesive channels, a combination of these, or another type of fastener. In some instances, the first set of fastening elements 216 can include one or more layers of adhesive on the first surface 212, where the layer of adhesive couples the first surface 212 of the flat plate bracket 210 to the table top boards 108 of the table top. In certain instances, the first set of fastening elements 216 are integral with the first surface 212 of the flat plate bracket 210, such that the first set of fastening elements 216 are formed in the flat plate bracket 210 or otherwise integrally part of the flat plate bracket 210. In some examples, the first set of fastening elements 216 includes nails or studs extending from the first surface 212 and configured to engage the plurality of table top boards 108.

In the example first bracket assembly 120 of FIGS. 1A, 1B, 2A, and 2B, the second set of fastening elements 218 on the second surface 214 includes multiple studs 222 (three shown) protruding from the second surface 214 of the flat plate bracket 210, where the studs 222 selectively attach the flat plate bracket 210 to the upper bar 204 of the support structure 104. For example, the upper bar 204 includes receiving apertures 205 (three shown) configured to receive the studs 222 and connect the flat plate bracket 210 to the support structure 104. The number and location of the receiving apertures 205 in the upper bar 204 matches the number and location of the studs 222 of the flat plate bracket 210. The studs 222 can be threaded, and can be releasably secured to the upper bar 204 with a nut (and optionally a washer) engaging the threads of a respective stud 222. The studs 222 provide for a secure coupling of the flat plate bracket 210 to the support structure 104. The flat plate bracket 210 is used to selectively couple to the support structure 104, while also allowing for simple releasing of the flat plate bracket 210 from the support structure 104 for an easy interchange to a different support structure with similar receiving structures (e.g., receiving apertures). The second set of fastening elements 218 provide a selective (i.e., releasable, or impermanent) attachment between the flat plate bracket 210 and the support structure 104, for example, to allow for easy assembly or interchanging of support structures, which provides a modular system of connections to a variety of different support systems.

Though the second set of fastening elements 216 are shown in FIGS. 1A, 1B, 2A, and 2B as including studs 222, the second set of fastening elements 218 can take other forms. For example, the second set of fastening elements 218 can include threaded studs, pins with key channels, twist-lock fasteners, a combination of these, or another type of fastener. In some implementations, the second set of fastening elements 218 are integral with the flat plate bracket 210. For example, the second set of fastening elements 218 can be integral with the second surface 214 of the flat plate bracket 210, such that the second set of fastening elements 218 are formed in the flat plate bracket 210 or otherwise integrally part of the flat plate bracket 210. In some examples, the second set of fastening elements 218 includes selectively releasable fasteners to selectively engage the support structure 104 (or other bracket structure), such as threaded bolts, threaded studs, pins with key channels, twist-lock fasteners, or a combination of these.

The first bracket assembly 120 and second bracket assembly 130 have a similar structure (for example, include a first set of fastening elements on a first surface and a second set of fastening elements on a second, opposite surface), but can differ in length (or width or other dimension), distribution of the fastening elements, number and location of fastening elements, type of fastening elements, or a combination of these. Also, the second bracket assembly 130 attaches to the shelf boards 110 or panels of the bottom shelf 106, and selectively (or releasably) attaches to the lower bar 206 of the example support structure 104. For example, FIG. 2B shows the flat plate bracket 240 of the second bracket assembly 130 as having a shorter length than the flat plate bracket 210 of the first bracket assembly 120, and including fewer apertures 242 and studs 244 (two shown). In the case of the second bracket assembly 130, the apertures 242 provide for attachment to the shelf boards 110 of the bottom shelf 106.

Figure 2C:
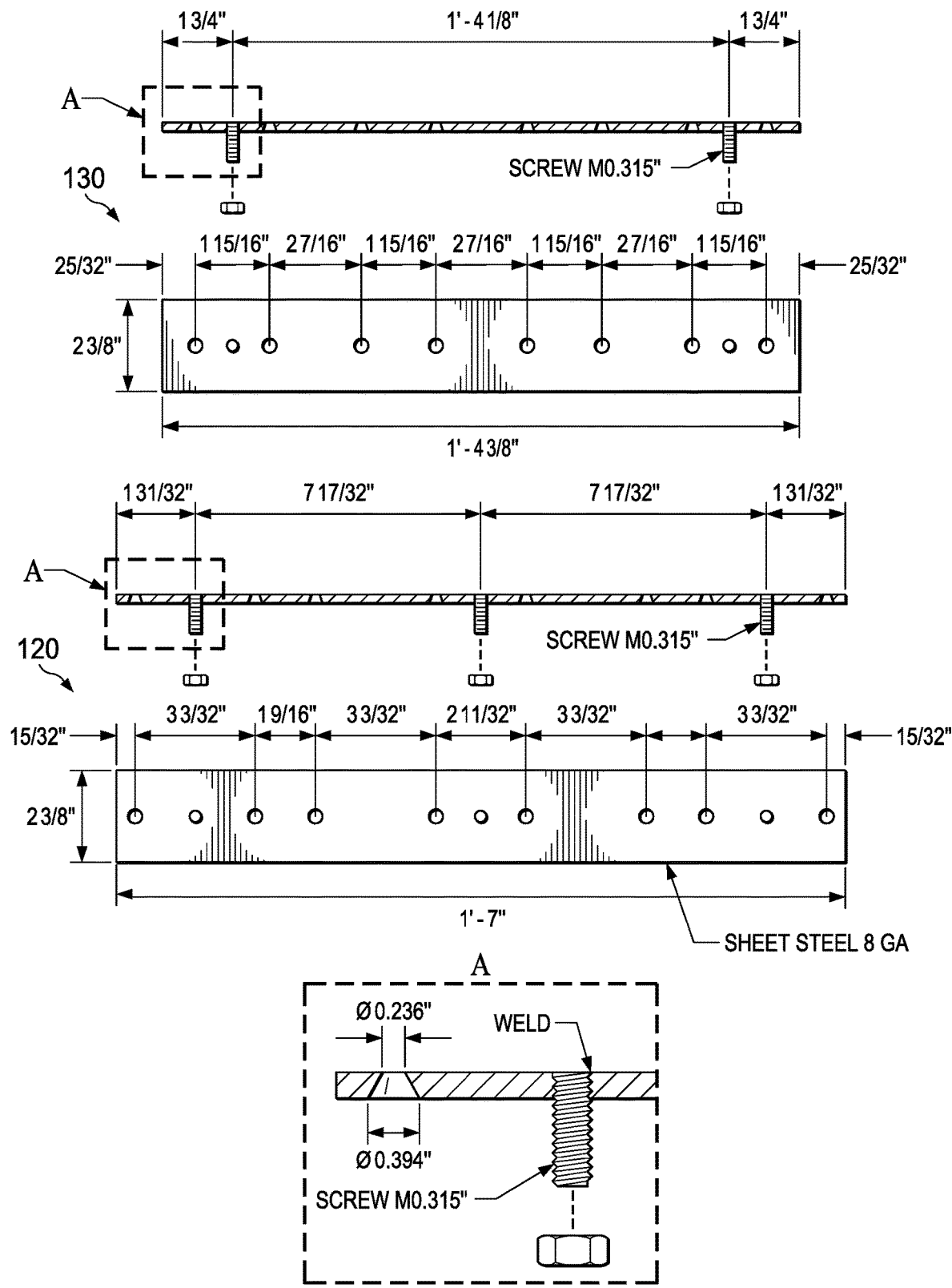
FIG. 2C is side, top, and cross-sectional views of the example first bracket assembly and second bracket assembly of FIGS. 2A and 2B.

FIG. 2C are side, top, and cross-sectional views of the example first bracket assembly 120 and second bracket assembly 130, with example dimensions and arrangement of apertures 220 and studs 222. The dimensions, distribution, and layout of the features of the first bracket assembly 120, second bracket assembly 130, or both, can vary from those shown in FIG. 2C, for example, to match with a different table top, support structure, bottom shelf, other furniture structure, or a combination of these.

Figure 3A:
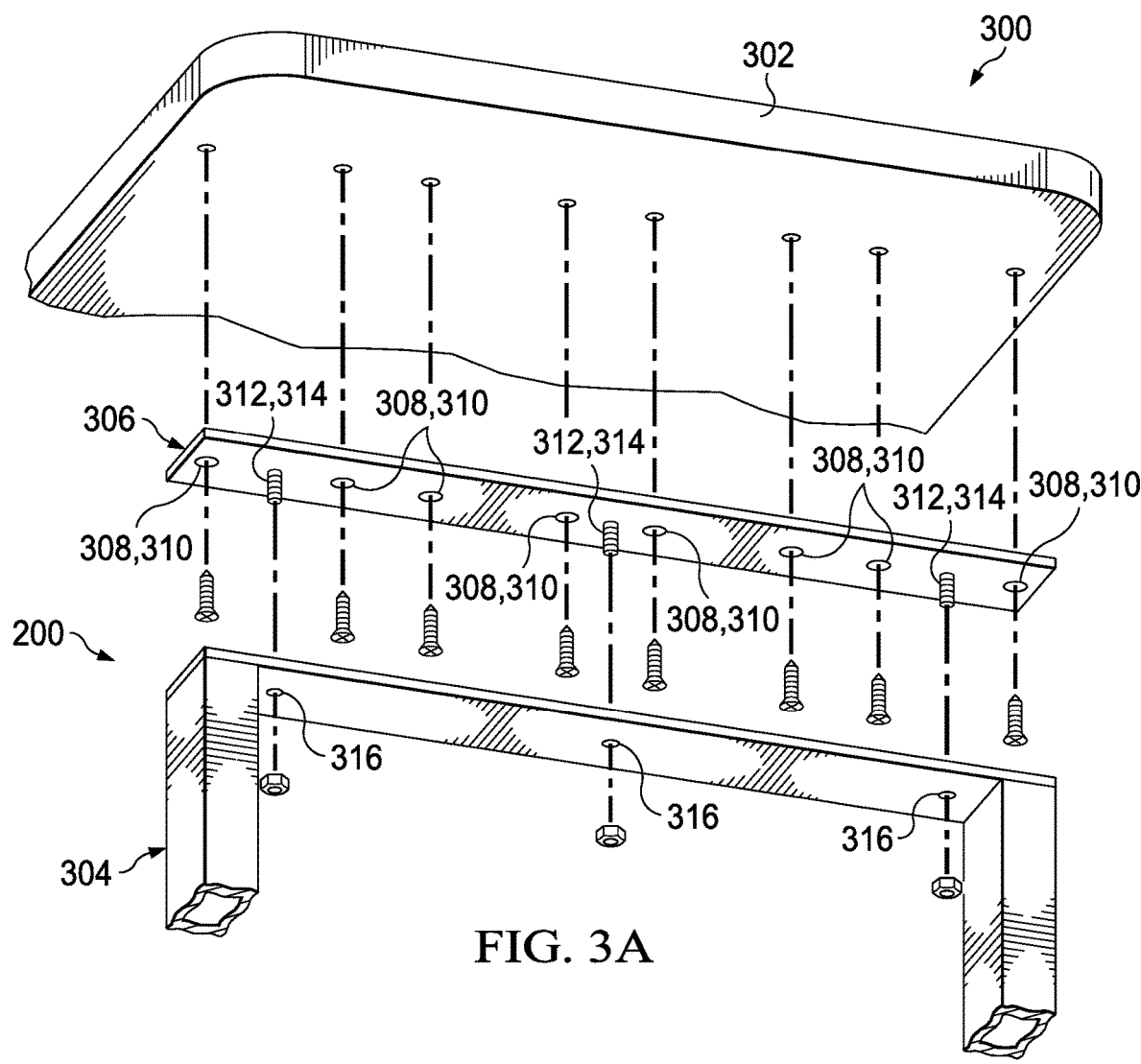
FIG. 3A is a partial bottom perspective view of a first example furniture assembly in a disassembled state.
Figure 3B:
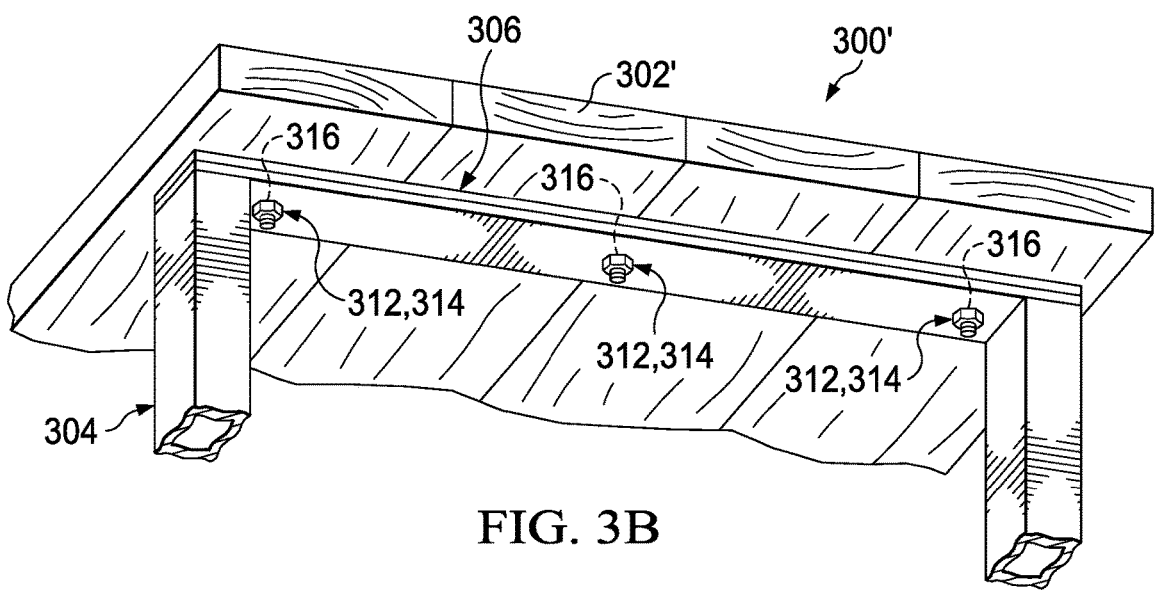
FIG. 3B is a partial bottom perspective view of a second example furniture assembly in an assembled state.

FIG. 3A is a partial bottom perspective view of a first example furniture assembly 300 in a disassembled state, and FIG. 3B is a partial bottom perspective view of a second example furniture assembly 300' in an assembled state. The first example furniture assembly 300 can be similar to and be incorporated in the example table 100 of FIG. 1A, in that the first example furniture assembly 300 includes a table top 302 (similar to table top 102), a support structure 304 (similar to support structure 104), and a bracket assembly 306 (similar to first bracket assembly 120). The bracket assembly 306 includes a first set of fastening elements 308 in the form of apertures 310 (similar to the first set of fastening elements 216 and apertures 220) to connect the bracket assembly 306 to the table top 302, and includes a second set of fastening elements 312 in the form of threaded studs 314 (similar to the second set of fastening elements 218 and studs 222) to connect the bracket assembly 306 to the support structure 304. The threaded studs 314 can be positioned to engage receiving apertures 316 of the support structure 304 to position and selectively couple the bracket assembly 306, and thereby the table top 302, to the support structure 304.

The second example furniture assembly 300' of FIG. 3B is shown in an assembled state, and is the same as the first example furniture assembly 300 of FIG. 3A, except the table top 302' includes wood panels (instead of a composite top board 302 of FIG. 3A), and the bracket assembly 306 is shown as coupled to the support structure 304 in an assembled state. In particular, the threaded studs 314 are positioned through the receiving apertures 316 of the support structure 304 and secured with nuts on the respective threaded studs 314.

FIG. 4 is a flowchart describing an example method 400 for attaching a table top to a leg support system, for example, performed by the example first bracket assembly 120 of FIGS. 1A-2C. At 402, a set of table top boards are attached to a flat plate bracket on a first surface of the flat plate bracket with a first set of fastening elements of the flat plate bracket. At 404, a support system, such as a leg support system, is selectively attached to the flat plate bracket on a second surface of the flat plate bracket opposite the first surface with a second set of fastening elements of the flat plate bracket. In some implementations, the leg support system can subsequently be released from the flat plate bracket, for example, without damage done to the leg support system. In some examples, a second leg support system can be attached to the flat plate bracket on the second surface of the flat plate bracket with the second set of fastening elements.

A number of implementations have been described. Nevertheless, it will be understood that various modifications may be made without departing from the spirit and scope of the disclosure.

What is claimed is:

1. A bracket assembly, comprising:
   a bracket comprising a flat plate bracket, the flat plate bracket comprising a first surface, a second surface opposite the first surface, and a plurality of apertures through the bracket extending from the first surface to the second surface, each aperture of the plurality of apertures having a centerline axis;
   at least one table top board engaged with the first surface of the bracket and coupled to fasteners disposed through the plurality of apertures of the bracket;
   a plurality of studs protruding from the second surface of the bracket, wherein the plurality of studs selectively attach the bracket to an upper bar of a furniture leg support system, wherein the plurality of studs protrude from the second surface in a first direction, and the centerline axes of the plurality of apertures are parallel to the first direction; and
   the furniture leg support system comprising furniture legs extending vertically from the upper bar of the furniture leg support system, and the upper bar of the furniture leg support system comprising receiving apertures to receive the plurality of studs, wherein the upper bar is coupled directly to the furniture legs of the leg support system, and the upper bar is engaged with the second surface of the flat plate bracket.

2. The bracket assembly of claim 1, wherein the plurality of studs comprises at least one of threaded studs, pins with key channels, or twist-lock fasteners.

3. The bracket assembly of claim 1, wherein the plurality of studs are integral with the bracket.

4. The bracket assembly of claim 1, wherein the plurality of apertures are configured to receive the fasteners to couple the bracket to the at least one table top board.

5. The bracket assembly of claim 1, further comprising:
   a second bracket comprising a second flat plate bracket, the second flat plate bracket comprising a third surface, a fourth surface opposite the third surface, and a second plurality of apertures through the second bracket extending from the third surface to the fourth surface, each aperture of the second plurality of apertures having a centerline axis, the third surface configured to engage at least one shelf board;
   a second plurality of studs protruding from the fourth surface of the second bracket, the second plurality of studs configured to selectively attach the second bracket to a lower bar of the furniture leg support system, wherein the second plurality of studs protrude from the fourth surface in the first direction, and the centerline axes of the second plurality of apertures are parallel to the first direction; and
   the lower bar of the furniture leg support system comprising receiving apertures to receive the second plurality of studs, wherein the lower bar is connected to the furniture legs of the leg support system, and the lower bar is configured to engage with the fourth surface of the flat plate bracket.

6. The bracket assembly of claim 5, wherein the lower bar extends between the furniture legs of the leg support system.

7. The bracket assembly of claim 5, wherein the lower bar is positioned proximate to bottom vertical ends of the furniture legs.

8. A bracket assembly, comprising:
   a bracket comprising a first surface and a second surface opposite the first surface, wherein the first surface and the second surface are planar, and the first surface is parallel to the second surface;
   a first set of fastening elements on the first surface of the bracket to engage a plurality of table top boards and couple the bracket to the plurality of table top boards;
   a second set of fastening elements on the second surface of the bracket, the second set of fastening elements comprising selectively releasable fasteners to selectively couple the bracket to a support structure; and the support structure comprising a frame having an upper bar at a top of the support structure, the upper bar comprising receiving apertures to receive the second set of fastening elements and engage with the second surface of the bracket, and the upper bar of the support structure extends across an entire length of the frame between side ends of the frame.

9. The bracket assembly of claim 8, wherein the first set of fastening elements comprises at least one of apertures, threaded studs, screws, nails, pins with key channels, twist-lock fasteners, adhesive, or adhesive channels.

10. The bracket assembly of claim 8, wherein the first set of fastening elements comprises a plurality of apertures through the bracket extending from the first surface to the second surface, and a plurality of securement fasteners configured to be disposed through the plurality of apertures and engage the plurality of table top boards.

11. The bracket assembly of claim 8, wherein the first set of fastening elements comprises at least one layer of adhesive on the first surface, the layer of adhesive to couple the bracket to the plurality of table top boards.

12. The bracket assembly of claim 8, wherein the first set of fastening elements is integral with the first surface of the bracket.

13. The bracket assembly of claim 12, wherein the first set of fastening elements comprise nails or studs extending from the first surface and configured to engage the plurality of table top boards.

14. The bracket assembly of claim 8, wherein the selectively releasable fasteners comprise at least one of threaded bolts, threaded studs, pins with key channels, or twist-lock fasteners.

15. The bracket assembly of claim 8, wherein the support structure comprises a leg support system, and the upper bar is disposed across a top of the leg support system.

16. The bracket assembly of claim 15, wherein the leg support system comprises a furniture leg support.

17. The bracket assembly of claim 8, wherein the bracket is a flat plate bracket.

18. The bracket assembly of claim 8, wherein the plurality of table top boards are in contact with and engage the first surface of the bracket, the plurality of table top boards being coupled to the first set of fastening elements.

19. The bracket assembly of claim 8, further comprising:
a second bracket comprising a third surface and a fourth surface opposite the third surface, wherein the third surface and the fourth surface are planar, and the third surface is parallel to the fourth surface;

a third set of fastening elements on the third surface of the second bracket to engage at least one shelf board and couple the second bracket to the at least one shelf board; and a fourth set of fastening elements on the fourth surface of the second bracket, the fourth set of fastening elements comprising selectively releasable fasteners to selectively couple the second bracket to the support structure; and the support structure further comprising a lower bar comprising receiving apertures to receive the fourth set of fastening elements and engage with the fourth surface of the second bracket.

20. A method for attaching a table top to a leg support system, the method comprising:
attaching, with a first set of fastening elements of a bracket, a set of table top boards to the bracket on a first surface of the bracket, wherein the set of table top boards contact the first surface of the bracket, the bracket comprising the first surface and a second surface opposite the first surface, wherein the first surface and second surface are planar, and the first surface is parallel to the second surface; and selectively attaching, with a second set of fastening elements of the bracket, an upper bar of a leg support system to the bracket on the second surface of the bracket opposite the first surface, wherein the upper bar of the leg support system comprises receiving apertures to receive the second set of fastening elements, the upper bar contacts the second surface of the bracket, and the upper bar of the leg support system extends across an entire length of the leg support system between side ends of the leg support system.

21. The method of claim 20, further comprising releasing the leg support system from the bracket.

22. The method of claim 21, further comprising attaching, with the second set of fastening elements, a second leg support system to the bracket on the second surface of the bracket.

23. The method of claim 20, wherein attaching the set of table top boards to the bracket with the first set of fastening elements comprises permanently fastening the bracket to the set of table top boards with at least one of nails, screws, or adhesive.

24. The method of claim 20, wherein selectively attaching the upper bar of the leg support system to the bracket with the second set of fastening elements comprises fastening the bracket to the leg support system with at least one of threaded bolts, threaded studs, pins with key channels, or twist-lock fasteners.

25. The method of claim 20, wherein the bracket is a flat plate bracket.

* * * * *